US012577805B2

(12) United States Patent
Farag et al.

(10) Patent No.: US 12,577,805 B2
(45) Date of Patent: Mar. 17, 2026

(54) LOCK ASSEMBLY AND METHOD OF INSTALLING THE SAME

(71) Applicant: ASSA ABLOY Americas Residential Inc., New Haven, CT (US)

(72) Inventors: Hanna Farag, Jurupa Valley, CA (US); Jack Zhang, Xiamen (CN)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 59 days.

(21) Appl. No.: 18/602,199

(22) Filed: Mar. 12, 2024

(65) Prior Publication Data

US 2024/0309676 A1 Sep. 19, 2024

Related U.S. Application Data

(60) Provisional application No. 63/490,744, filed on Mar. 16, 2023.

(51) Int. Cl.

| | |
|---|---|
| ***E05B 9/08*** | (2006.01) |
| ***E05B 9/02*** | (2006.01) |
| ***E05B 17/00*** | (2006.01) |
| ***E05B 63/00*** | (2006.01) |

(52) U.S. Cl.

CPC .................. *E05B 9/08* (2013.01); *E05B 9/02* (2013.01); *E05B 17/002* (2013.01); *E05B 63/0017* (2013.01)

(58) Field of Classification Search

CPC ... E05B 9/002; E05B 9/02; E05B 9/08; E05B 2009/004; E05B 17/002; E05B 17/04; E05B 63/0013; E05B 63/0017

See application file for complete search history.

(56) References Cited

U.S. PATENT DOCUMENTS

| | | | | |
|---|---|---|---|---|
| 1,661,454 A | 3/1928 | Wilson | | |
| 4,268,075 A * | 5/1981 | Allenbaugh | ........ | E05B 63/0017 292/1.5 |
| 5,881,590 A * | 3/1999 | Small | .................. | E05B 63/0017 70/451 |
| 6,857,297 B1 * | 2/2005 | Ruan | .................. | E05B 63/0017 292/1.5 |

(Continued)

FOREIGN PATENT DOCUMENTS

| | | |
|---|---|---|
| KR | 20-2008-0003181 U | 8/2008 |
| KR | 20-2014-0001738 | 3/2014 |

(Continued)

OTHER PUBLICATIONS

PCT International Search Report and Written Opinion in International Application PCT/US2024/019697, mailed Jul. 15, 2024, 14 pages.

*Primary Examiner* — Christopher J Boswell

(74) *Attorney, Agent, or Firm* — Merchant & Gould P.C.

(57) ABSTRACT

An electronic lock assembly includes a housing assembly with one or more elastomeric retainers that extend from a rear of the housing assembly. The elastomeric retainers project axially and/or radially from the other components of the housing assembly so as to engage within a bore of a door and facilitate retaining the housing assembly on the door. The elastomeric retainer may at least partially capture a wiring harness and seal the portion of the wiring harness extending from the housing assembly.

20 Claims, 10 Drawing Sheets

(56) References Cited

U.S. PATENT DOCUMENTS

| | | | | |
|---|---|---|---|---|
| 7,281,401 | B2 | 10/2007 | Shen | |
| 7,900,489 | B2 | 3/2011 | Roth et al. | |
| 9,758,991 | B2 * | 9/2017 | Lin | E05B 17/002 |
| 9,809,996 | B2 | 11/2017 | Ohl et al. | |
| 10,808,420 | B2 * | 10/2020 | Morstatt | E05B 17/002 |
| 11,248,392 | B1 * | 2/2022 | Gray | E05B 9/08 |
| 11,299,910 | B2 * | 4/2022 | Huang | E05C 9/026 |
| 11,946,283 | B2 * | 4/2024 | Uyeda | E05B 17/002 |
| 2006/0179904 | A1 | 8/2006 | Shen | |
| 2021/0156171 | A1 | 5/2021 | Uyeda et al. | |
| 2023/0228118 | A1 | 7/2023 | Bui et al. | |
| 2024/0068271 | A1 * | 2/2024 | Wong | E05B 15/1614 |
| 2024/0076901 | A1 * | 3/2024 | Caterino | E05B 9/08 |

FOREIGN PATENT DOCUMENTS

| | | | |
|---|---|---|---|
| KR | 20-0485543 | Y1 | 1/2018 |
| WO | 2021/102117 | | 5/2021 |
| WO | 2023/038833 | | 3/2023 |
| WO | 2023/076962 | | 5/2023 |

* cited by examiner

LOCK ASSEMBLY AND METHOD OF INSTALLING THE SAME

CROSS-REFERENCE TO RELATED APPLICATIONS

This application claims the benefit of priority to U.S. Provisional Patent Application No. 63/490,744, filed Mar. 16, 2023, the entire disclosure of which is incorporated herein by reference in its entirety.

BACKGROUND

Locks (e.g., electronic and/or mechanical locks) may be utilized for securing access in both residential and commercial settings. At least some known locks include interior and exterior housing assemblies mounted at a bore of a door for controlling a latch assembly. Retaining the housing assembles at the bore is known to be difficult as the housing assembles need to be secured and flush with the door surface while also being operatively coupled together via electrical and/or mechanical connections. Improvements to door mounting components are thereby desired.

SUMMARY

The present disclosure relates generally to lock assemblies and elastomeric retention components for facilitating retention of a housing assembly during installation on a door. The elastomeric retainers are configured to compress and engage within a bore of the door to retain a position and/or orientation of the housing assembly without the need for manual support by the installer.

In an aspect, the technology relates to a lock assembly for a door including: a latch assembly having a bolt movable between at least an extended position and a retracted position; a torque blade coupled to the latch assembly and selectively rotatable for moving the bolt between the extended position and the retracted position; and a housing assembly configured to couple to the torque blade for driving rotation thereof, the housing assembly including: a housing having one or more bore projections, the one or more bore projections configured to be received at least partially within a bore within the door such that at least a portion of the housing is positionable against a surface of the door; and one or more elastomeric retainers coupled to the housing and extending adjacent the one or more bore projections, wherein the one or more elastomeric retainers are configured to be received at least partially within the bore and engage with a sidewall of the bore so as to retain the housing assembly on the door.

In an example, the housing further includes a mounting plate having the one or more bore projections and an outer housing body configured to couple to the mounting plate, at least a portion of the one or more elastomeric retainers are disposed between the outer housing body and the mounting plate. In another example, at least a portion of the one or more elastomeric retainers are supported on the outer housing body. In yet another example, the one or more bore projections is a single, substantially cylindrical shaped projection having an outer diameter, at least a portion of the one or more elastomeric retainers radially extending beyond the outer diameter of the substantially cylindrical shaped projection. In still another example, a distal end of the one or more elastomeric retainers extends further out from the housing than the one or more bore projections.

In an example, the housing assembly further includes a wiring harness, at least a portion of the one or more elastomeric retainers configured to receive the wiring harness that extends out of the housing assembly. In another example, the one or more elastomeric retainers form a seal at least partially around the wiring harness.

In another aspect, the technology relates to an electronic lock housing assembly for a door including: a mounting plate including a substantially cylindrical bore projection, the substantially cylindrical bore projection configured to be received at least partially within a bore within the door such that the mounting plate is positionable against a surface of the door; an outer housing body coupled to the mounting plate and configured to support one or more systems configured to actuate a latch assembly; and one or more elastomeric retainers positioned along an outer perimeter of the substantially cylindrical bore projection, distal ends of the one or more elastomeric retainers projecting further out from the mounting plate than the substantially cylindrical bore projection, wherein the one or more elastomeric retainers are configured to be received at least partially within the bore and engage with a sidewall of the bore so as to retain the housing assembly on the door.

In an example, the one or more elastomeric retainers include a first retainer discrete from and different than a second retainer. In another example, each of the first retainer and the second retainer have an outer radial surface, the outer radial surfaces defining an outer diameter distance that is greater than an outer diameter of the substantially cylindrical bore projection. In yet another example, the outer housing body includes at least one support arm, the first retainer coupled to the at least one support arm. In still another example, the second retainer defines a channel configured to at least partially receive a wiring harness.

In an example, the first retainer is disposed approximately 180° relative to the second retainer. In another example, at least one of the first and second retainers include a flange that is captured between the mounting plate and the outer housing body.

In another aspect, the technology relates to a lock assembly for a door including: a latch assembly having a bolt movable between at least an extended position and a retracted position; a torque blade coupled to the latch assembly and selectively rotatable for moving the bolt between the extended position and the retracted position; and an exterior housing assembly configured to couple to the torque blade for driving rotation thereof, the exterior housing assembly including: a housing including one or more bore projections, the one or more bore projections configured to be received at least partially within a bore within the door such that the housing is positionable against a surface of the door; one or more elastomeric retainers coupled to the housing and extending adjacent the one or more bore projections, wherein the one or more elastomeric retainers are configured to be received at least partially within the bore and engage with a sidewall of the bore so as to retain the exterior housing assembly on the door; and at least a portion of an electronic actuation system for the latch assembly and configured to drive rotation of the torque blade In an example, the one or more elastomeric retainers include a first retainer and a second retainer disposed on opposite sides of the torque blade. In another example, a wiring harness is included, the wiring harness extending through at least one of the first and second retainers. In yet another example, the second retainer is substantially square-shaped with a channel defined therein, the wiring harness disposed at least partially within the channel. In still another example, the first retainer is substantially U-shaped, each leg of the first retainer supported on the housing. In an example, the first and second retainers and the one or more bore projections form a substantially cylindrical shape corresponding to the bore of the door, the first and second retainers being less than half of an outer perimeter of the substantially cylindrical shape.

In another example, the housing includes an outer housing body and a mounting plate, the mounting plate having the one or more bore projections. In yet another example, the exterior housing assembly further includes a key cylinder mounted on the housing and coupled to the torque blade.

In another aspect, the technology relates to a method of installing a lock assembly on a door, the method including: providing a housing assembly including a mounting plate having a substantially cylindrical bore projection, one or more elastomeric retainers positioned along an outer perimeter of the substantially cylindrical bore projection, and a wiring harness, distal ends of the one or more elastomeric retainers projecting further out from the mounting plate than the substantially cylindrical bore projection; inserting the substantially cylindrical bore projection with the one or more elastomeric retainers within a bore of the door such that the mounting plate is positioned against a surface of the door, wherein the one or more elastomeric retainers engage with a sidewall of the bore so as to retain the housing assembly on the door; and upon retention of the housing assembly within the bore of the door, sealing the wiring harness at the housing assembly with the one or more elastomeric retainers.

In another aspect, the technology relates to an elastomeric retention assembly for a lock assembly including: a first elastomeric retainer including a base, a first leg, and a second leg, each of the first leg and the second leg having an end through which a receiver opening is formed, the receiver opening being shaped and sized to receive a support arm of a lock housing body, wherein a first curved bore engagement outer surface is defined at least partially along a side of the base, the first leg, and the second leg, the first curved bore engagement outer surface having a tapered end at distal ends of each of the first leg and the second leg tapering toward the end having the respective receiver opening; and a discrete second elastomeric retainer including a flange and a second bore engagement outer surface extending therefrom, the second elastomeric retainer defining a channel therethrough and accessible via a slit defined through the flange and the second bore engagement outer surface extending therefrom, the channel shaped and sized to receive at least one wire of the lock assembly.

In an example, the first curved bore engagement outer surface and the second curved bore engagement outer surface are configured to be position against a portion of an inner bore surface of a door.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
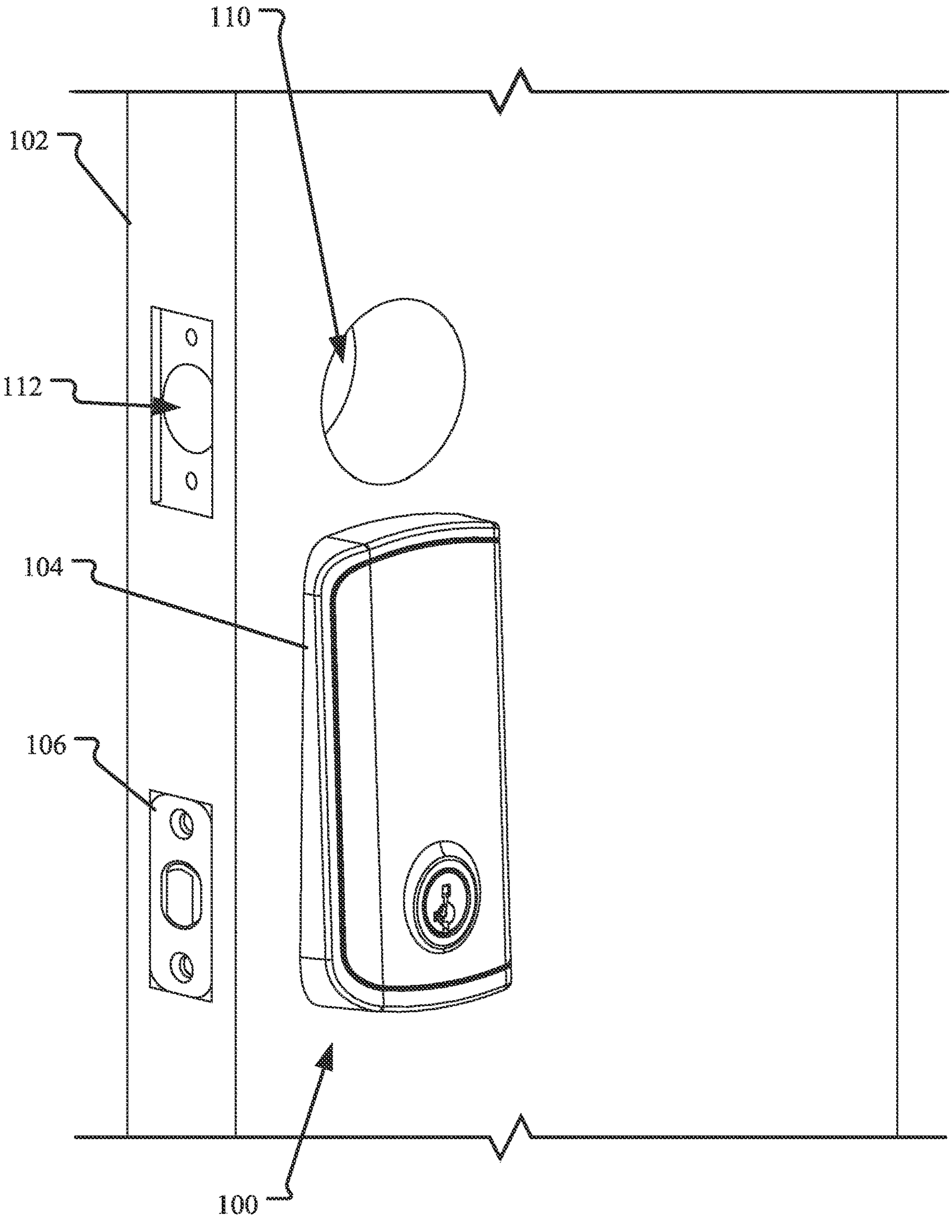
FIG. 1 is a perspective view of an exemplary electronic lock assembly mounted on a door and in accordance with the principles of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible embodiments for the appended claims.

Electronic lock assemblies typically include two housing assemblies, one for each side of a door, and a latch assembly that is operable via one or more actuation systems located within the two housing assemblies. The two housing assemblies are operatively coupled to each other and to the latch assembly all within a bore of the door. One of the housing assemblies is on a more secure side of the door, and thus, is configured to reduce tampering and access to the electronic lock assembly. Because the two housing assemblies are on opposite sides of the door and need to be coupled together, retaining one of the housing assemblies on the door during installation without being manually supported assists the installer.

The electronic lock assembly described below includes one or more elastomeric retainers extending from a rear of the housing assembly. The elastomeric retainers may project axially and/or radially from the other components of the housing assembly so as to engage within the bore and facilitate retaining the housing assembly on the door. In the examples, the elastomeric retainers are configured to compress against the bore and retain the position and/or orientation of the housing assembly within the bore and against the surface of the door. This retention allows for ease of installation as the housing assembly can remain on the door on its own without the installer needing to manually support it.

In examples, the elastomeric retainer may also at least partially capture a wiring harness and seal the portion of the wiring harness extending from the housing assembly.

The term "lock" or "lockset" is broadly intended to include any type of lock, including, but not limited to, deadbolts, knob locks, lever handle locks, mortise locks, and slide locks, whether mechanical, electrical, or electro-mechanical locks. The locking points may have various mounting configurations and/or locations, including, but not limited to: mortised within the doorframe, mounted externally to the doorframe or support structure, and/or affixed directly to the door.

Figure 3:
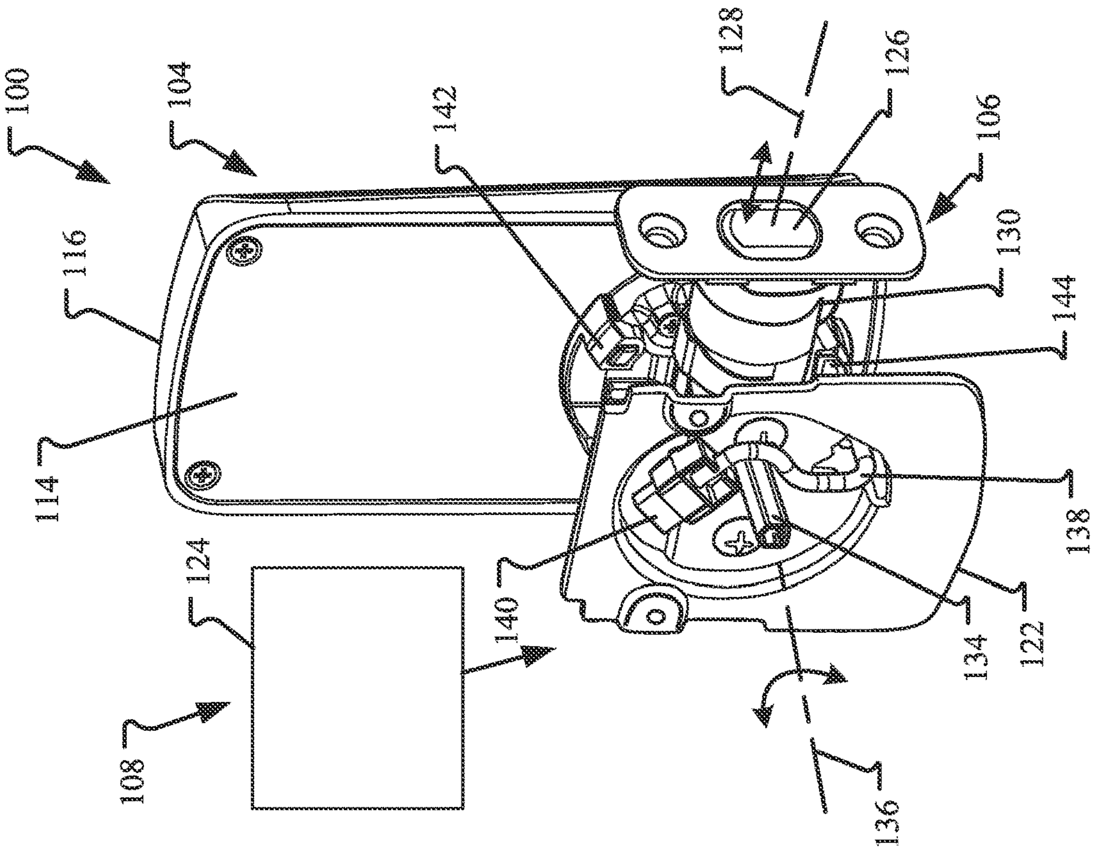
FIG. 3 is another perspective view of the electronic lock assembly shown in FIG. 1.
Figure 2:
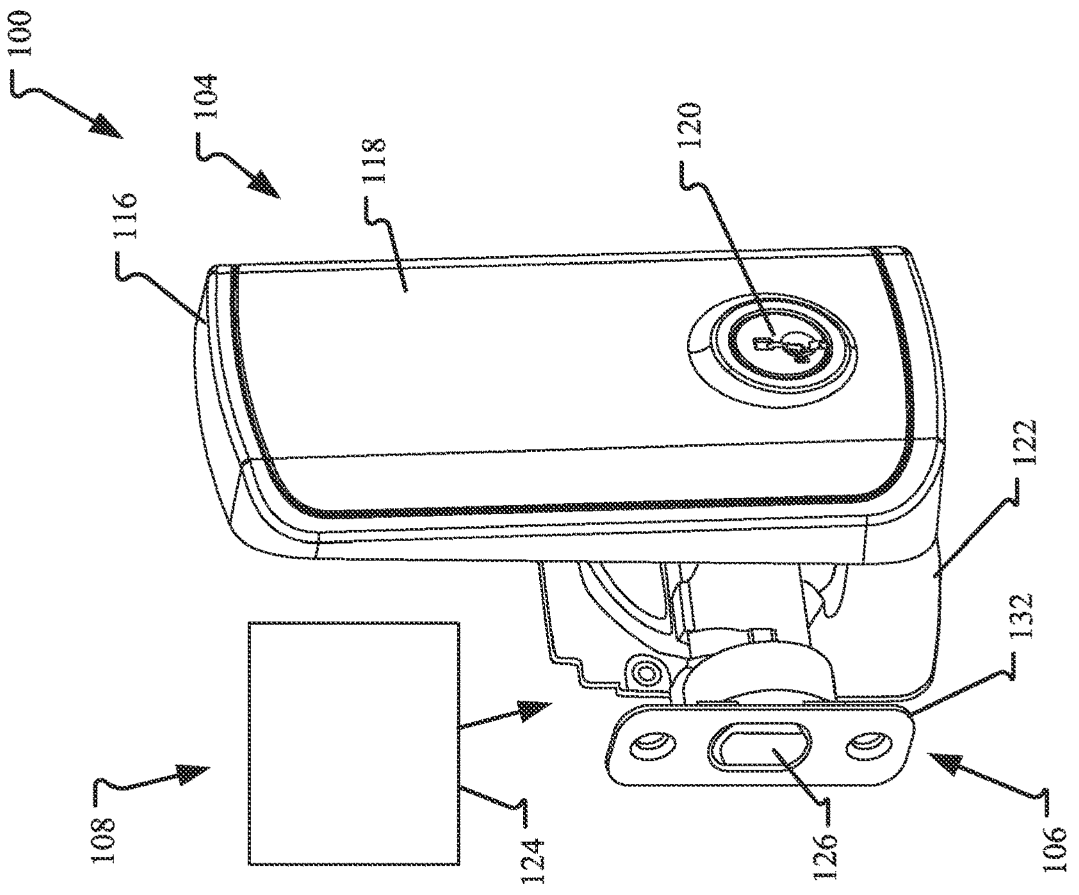
FIG. 2 is a perspective view of the electronic lock assembly shown in FIG. 1.

FIG. 1 is a perspective view of an exemplary electronic lock assembly 100 mounted on a door 102. FIGS. 2 and 3 are perspective views of the electronic lock assembly 100. Referring concurrently to FIGS. 1-3, the electronic lock assembly 100 includes an exterior housing assembly 104, a latch assembly 106, and an interior housing assembly 108. Typically, the exterior housing assembly 104 is mounted on the outside of the door 102, while the interior housing assembly 108 is mounted inside of the door 102. The latch assembly 106 is mounted in a bore 208 (shown in FIG. 12) formed in the door 102. The bore that the electronic lock assembly 100 mounts to is not shown in FIG. 1, however, the bore is similar to a deadbolt bore 110 that is disposed above the electronic lock assembly 100 and configured to receive a deadbolt assembly (not shown). The deadbolt bore 110 is substantially cylindrical in shape and extends through both the outside and inside surfaces of the door 102. An edge bore 112 extends from the edge of the door 102 and into the deadbolt bore 110 for a latch, bolt, deadbolt, etc.

The term "outside" is broadly used to mean an area outside the door 102 and "inside" is also broadly used to denote an area inside the door 102. With an exterior entry door, for example, the exterior housing assembly 104 may be mounted outside a building, while the interior housing assembly 108 may be mounted inside the building. With an interior door, the exterior housing assembly 104 may be mounted inside a building, but outside a room secured by the electronic lock assembly 100, while the interior housing assembly 108 may be mounted into the secured room. The electronic lock assembly 100 is applicable to both interior and exterior doors as required or desired.

In the example, the exterior housing assembly 104 includes a mounting plate 114 that mounts to the exterior surface of the door 102 and an outer housing body 116 that that couples to the mounting plate 114 and supports one or more systems configured to actuate the latch assembly 106. For example, the outer housing body 116 supports a touch screen or touch interface 118 that may be used to enter a passcode for electronically locking/unlocking the electronic lock assembly 100 or otherwise control operation thereof via an electronic actuation system. Although a touch interface 118 is shown in this example, additionally or alternatively, other input devices may be utilized on the exterior housing assembly 104, such as, but not limited to, a keypad with one or more buttons, biometric interface (e.g., a fingerprint sensor, retina, scanner, or camera including facial recognition), audio interface with voice recognition, and the like. In the example, the outer housing body 116 also supports a key cylinder 120 so that a physical key (not shown) can be used to mechanically lock/unlock the electronic lock assembly 100. Accordingly, the exterior housing assembly 104 may be used to lock/unlock the electronic lock assembly 100 either electronically using the touch interface 118 or mechanically using the key cylinder 120. In examples, the mounting plate 114 and the outer housing body 116 may be generally referred to as a housing which is configured to house and support the components of the exterior housing assembly 104 contained therewith.

As illustrated, the exterior housing assembly 104 has a decorative rectangular shape, but round, square, and other shapes for the exterior housing assembly 104 can be utilized as required or desired. In some examples, a handle (not shown) may be included with the exterior housing assembly 104. The exterior housing assembly 104 is described in further detail below.

The interior housing assembly 108 includes a mounting plate 122 that mounts to the interior surface of the door 102 and an outer housing body 124 (illustrated schematically) that couples to the mounting plate 122 and houses components of the interior housing assembly 108 such as a motor and electromechanical control thereof. In examples, a turnpiece (not shown) is supported on the outer housing body 124 and used to manually lock/unlock the electronic lock assembly 100 from the interior of the door 102. Examples of an interior housing assembly and exemplary components and features that may be contained therein are described in WIPO International Patent Application No. PCT/US2022/042150, filed Aug. 31, 2022, now WO 2023/038833 and WIPO International Patent Application No. PCT/US2022/078734, filed Oct. 26, 2022, now WO 2023/076962 which are both incorporated herein by reference in their entireties.

The latch assembly 106 is mounted at least partially within an edge of the door 102 and is coupled to both the exterior housing assembly 104 and the interior housing assembly 108. The latch assembly 106 includes a bolt 126 that is movable between at least a locked (e.g., extended) and unlocked (e.g., retracted) position electronically and/or mechanically along a bolt axis 128. The bolt 126 moves linearly in and out of a sleeve 130. When the bolt 126 is retracted, an end of the bolt 126 is generally flush with a face plate 132 and as illustrated in FIGS. 1-3. When the bolt 126 is extended, the bolt 126 protrudes through an edge bore in the door 102 into an opening of a strike plate (not shown), which is positioned in a door jamb adjacent the door 102.

The latch assembly 106 is mounted in the door 102 between the interior housing assembly 108 and the exterior housing assembly 104. A drive shaft 134 (e.g., a torque blade) extends through a spindle drive (not shown) on the latch assembly 106 and couples to both the interior housing assembly 108 and the exterior housing assembly 104. The drive shaft 134 extends along and is rotatable around a shaft axis 136 to drive the movement of the bolt 126. The drive shaft 134 may be a single component or be formed from multiple components that transfer rotational movement there along as required or desired. In the example, the shaft axis 136 is orthogonal to the bolt axis 128. In operation, rotation of the drive shaft 134 in a first direction causes the bolt 126 to extend and rotation of the drive shaft 134 in the opposing direction causes the bolt 126 to retract. Rotation of the drive shaft 134 may be induced by manual rotation of the turnpiece, mechanical rotation via the key cylinder 120, and/or electronically controlled with a motor (not shown) housed within the interior housing assembly 108 and responsive to input from the touch interface 118 to extend/retract the bolt 126. In examples, the motor may be an electric motor that is powered by a power source housed within the interior housing assembly 108, such as, but not limited to, a battery pack.

In the example, the exterior housing assembly 104 is coupled in communication with the interior housing assembly 108. This coupling may allow electronic power and/or signals to be transmitted between the exterior housing assembly 104 and the interior housing assembly 108. The exterior housing assembly 104 includes a wiring harness 138 extending therefrom with an exterior connector 140 disposed on the free end. The wiring harness 138 enables a cable (e.g., electrical wires) to extend from the exterior housing assembly 104 and, for example, extend through the bore on the door 102 to reach towards the interior side and physically couple to the interior housing assembly 108.

As such, to install the electronic lock assembly 100 on the door 102, the exterior housing assembly 104 is first positioned on the exterior surface of the door 102 with the drive shaft 134 and wiring harness 138 extending through the bore. From the interior side of the door 102 and the mounting plate 122, the interior housing assembly 108 is secured to the door 102. However, maintaining position of the exterior housing assembly 104 during the assembly can be difficult as most of the assembly process occurs on the interior side of the door 102. Accordingly, and as further described herein, the exterior housing assembly 104 includes one or more elastomeric retainers 142, 144 coupled to the mounting plate 114 that are configured to be received at least partially within the bore and engage with the door 102 so as to retain the exterior housing assembly 104 on the door 102. These elastomeric retainers 142, 144 frictionally engage within the bore of the door 102 and facilitate maintaining position and/or orientation of the exterior housing assembly 104 on the door 102 during installation and during use of the electronic lock assembly 100. Additionally, one of the elastomeric retainers 144 can be used to at least partially seal around the wiring harness 138.

Figure 4:
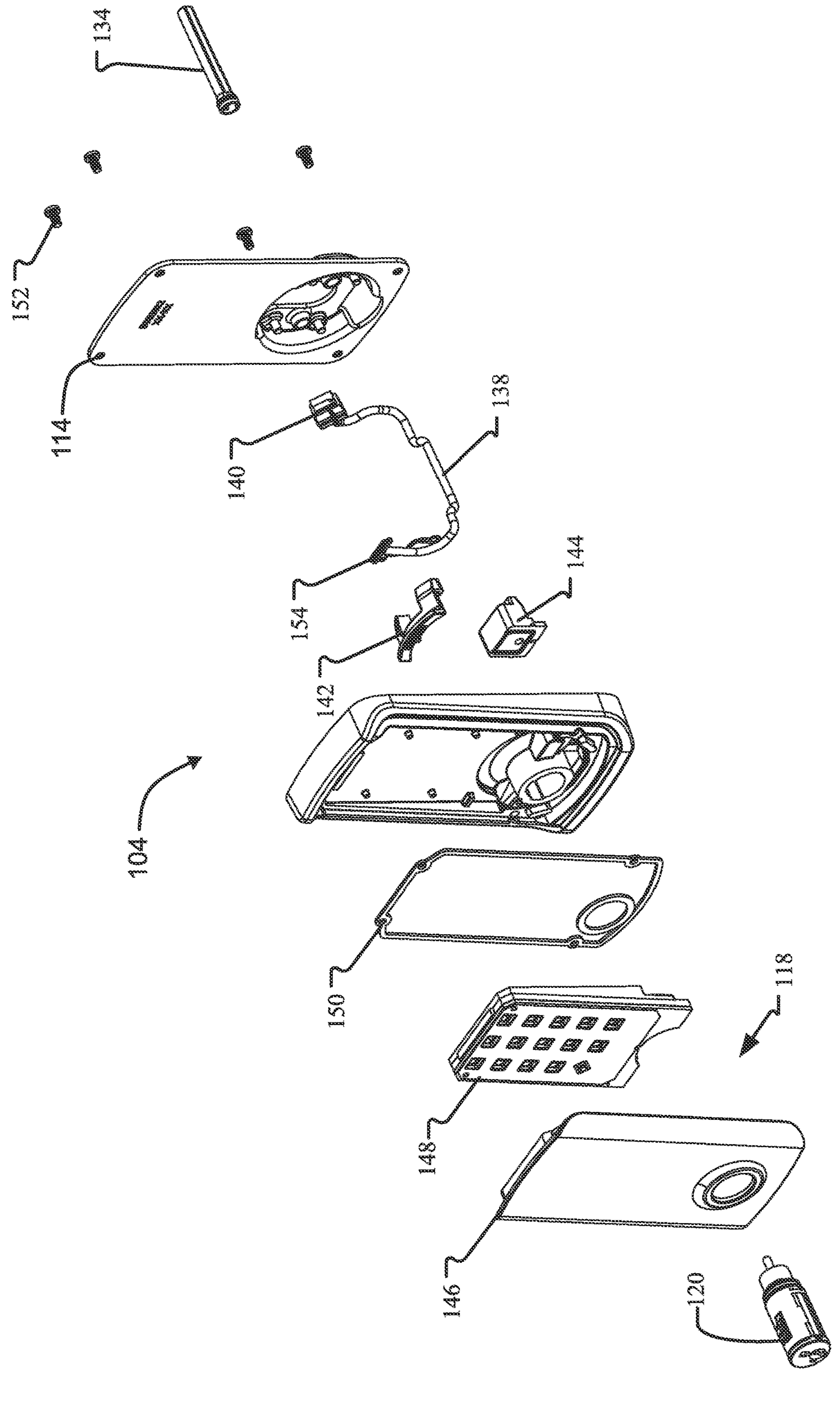
FIG. 4 is an exploded, perspective view of an exterior housing assembly of the electronic lock assembly shown in FIGS. 1-3.

FIG. 4 is an exploded, perspective view of the exterior housing assembly 104. The exterior housing assembly 104 includes the mounting plate 114, the outer housing body 116, and the touch interface 118. The touch interface 118, includes an outer cover 146 and internal touch components 148 (e.g., display screen, printed circuit board, etc.) that mounts to the outer side of the outer housing body 116 with one or more sealing gaskets 150. The outer housing body 116 also supports the key cylinder 120 that is accessible through the outer cover 146. The key cylinder 120 is coupled to the drive shaft 134 in order to drive rotation thereof. The mounting plate 114 mounts to the inner side of the outer housing body 116 with one or more fasteners 152. The elastomeric retainers 142, 144 are coupled to the outer housing body 116 via the mounting plate 114. Additionally, the wiring harness 138 has a first end 154 configured to coupled to the internal touch components 148 and a second end with the exterior connector 140.

Figure 5:
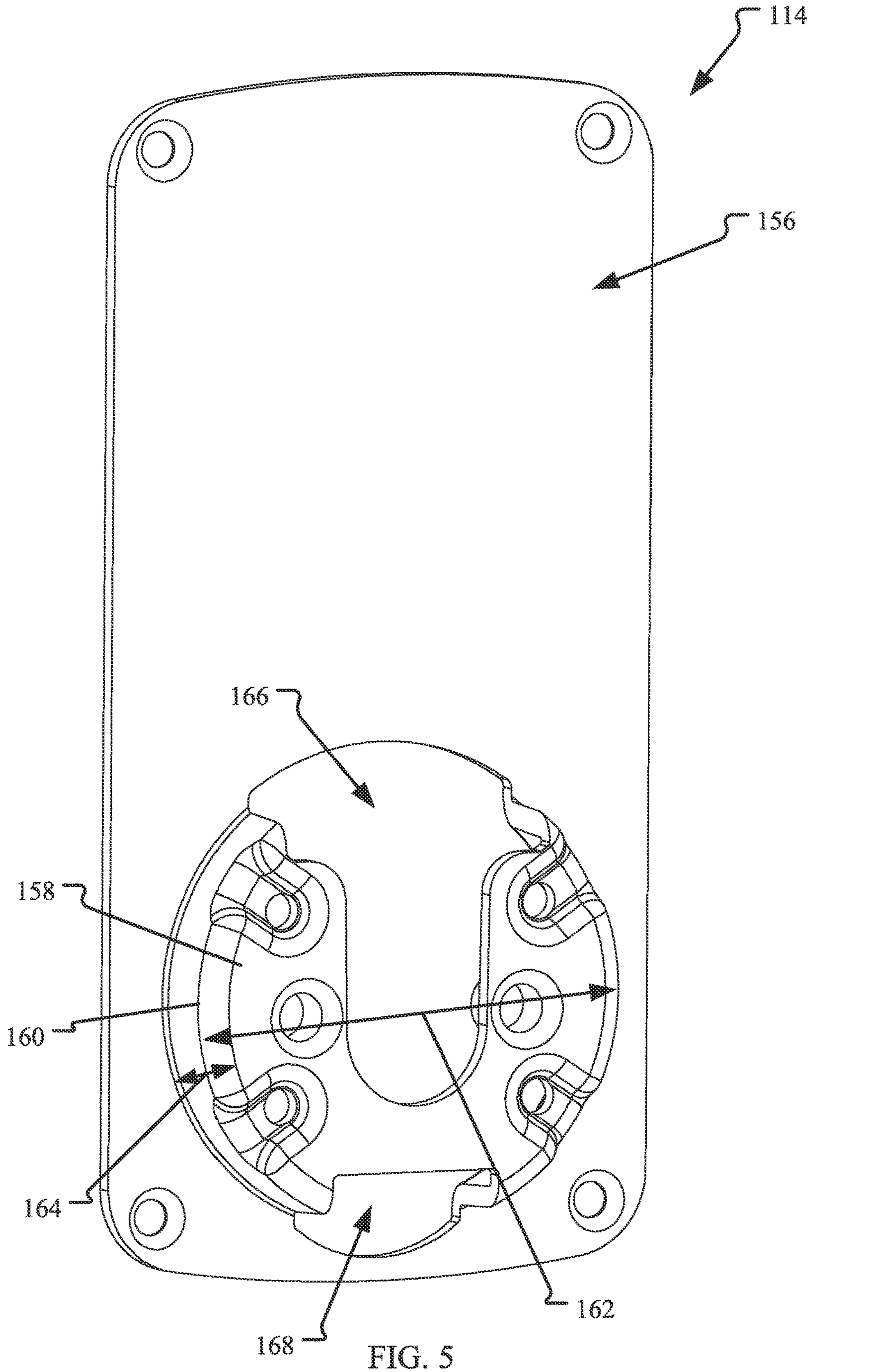
FIG. 5 is a rear perspective view of a mounting plate of the exterior housing assembly shown in FIG. 4.

FIG. 5 is a rear perspective view of the mounting plate 114. The mounting plate 114 has a rear surface 156 that is configured to face the door 102 (shown in FIG. 1). One or more bore projections 158 extend from the rear surface 156 and are configured to be received at least partially within the bore of the door 102. In the example, the bore projection 158 is a single, substantially cylindrical shaped projection having a sidewall perimeter 160 defining an outer diameter 162 and an extension distance 164. The outer diameter 162 corresponds to the size of the bore on the door 102 and so that the exterior housing assembly 104 (shown in FIG. 4) can be positioned on the door 102 for installation and use. In other examples, the bore projection 158 may be a plurality of projections as required or desired spaced to form a cylindrical shape.

The bore projection 158 defines a top opening 166 and an opposite bottom opening 168. The top opening 166 is configured to allow the drive shaft 134 (shown in FIG. 4) to extend outward from the exterior housing assembly 104. The bottom opening 168 is configured to allow the wiring harness 138 (shown in FIG. 4) to extend outward from the exterior housing assembly 104. Additionally, one or both of the openings 166, 168 are configured to receive the elastomeric retainers 142, 144 and allow the elastomeric retainers 142, 144 to project from the exterior housing assembly 104 and extend adjacent to the bore projection 158. The mounting plate 114 may be formed from a metal material, such as, stainless steel, aluminum, or the like. As such, retaining the bore projection 158 within the bore of the door is difficult without use of the elastomeric retainers 142, 144.

Figure 6:
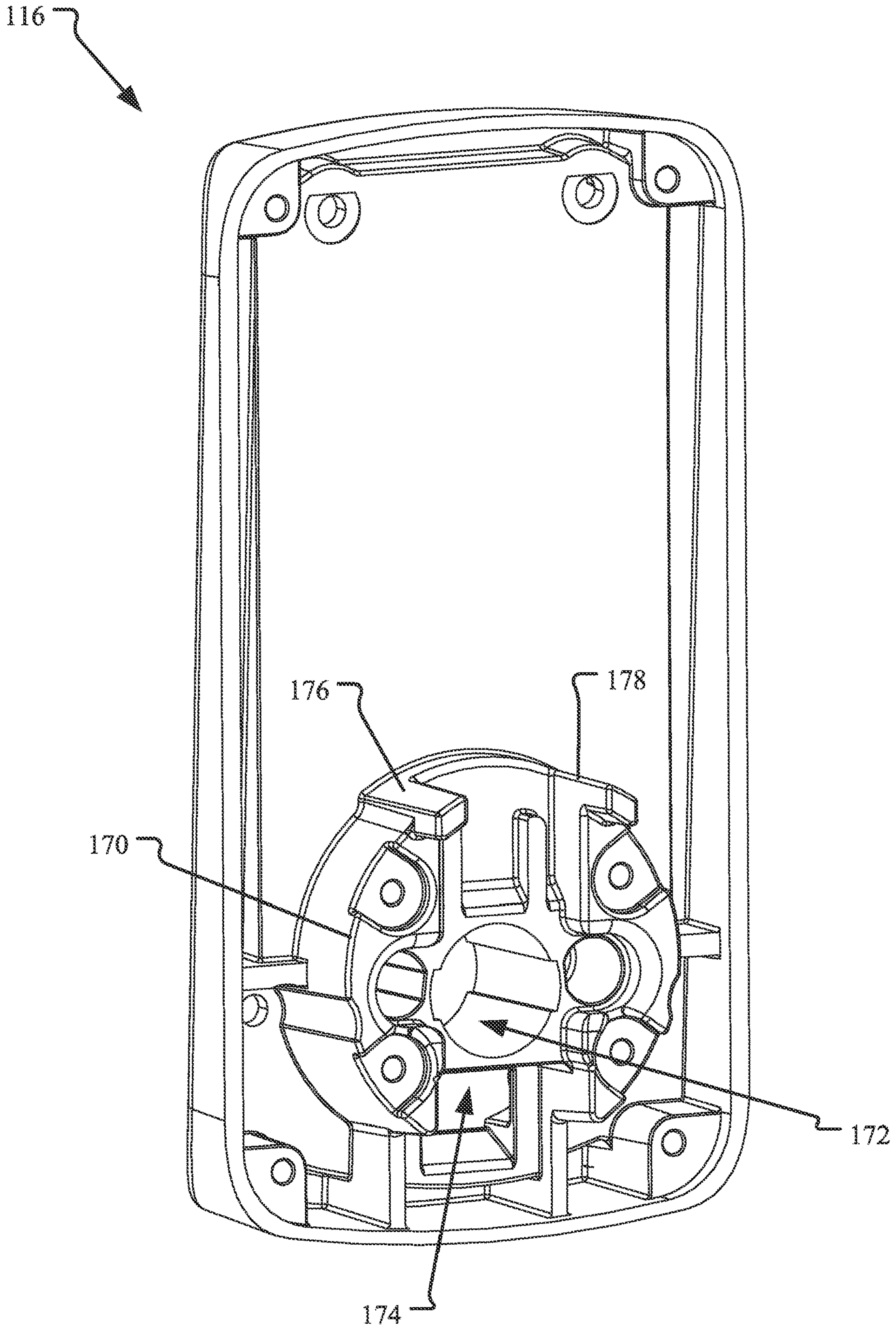
FIG. 6 is a rear perspective view of an outer housing body of the exterior housing assembly shown in FIG. 4.

FIG. 6 is a rear perspective view of the outer housing body 116. The outer housing body 116 may be formed from a plastic type material and may be formed by an injection molding process. The rear of the outer housing body 116 includes a bore support 170 that is received at least partially within the bore projection 158 of the mounting plate 114 (shown in FIG. 5) and is substantially cylindrical in shape. The bore support 170 includes a center opening 172 such that the key cylinder 120 (shown in FIG. 4) can be rotatably mounted therein and a bottom opening 174 such that the wiring harness 138 (shown in FIG. 4) can extend through the outer housing body 116. The center opening 172 aligns with the top opening 166 (shown in FIG. 5) of the mounting plate 114 and the bottom opening 174 aligns with the bottom opening 168 (shown in FIG. 5) of the mounting plate 114.

At the top of the outer perimeter of the bore support 170, a pair of circumferentially spaced support arms 176, 178 project from the outer housing body 116. The support arms 176, 178 are configured to support the elastomeric retainer 142 and are configured to extend through the top opening 166 of the mounting plate 114.

Figure 7:
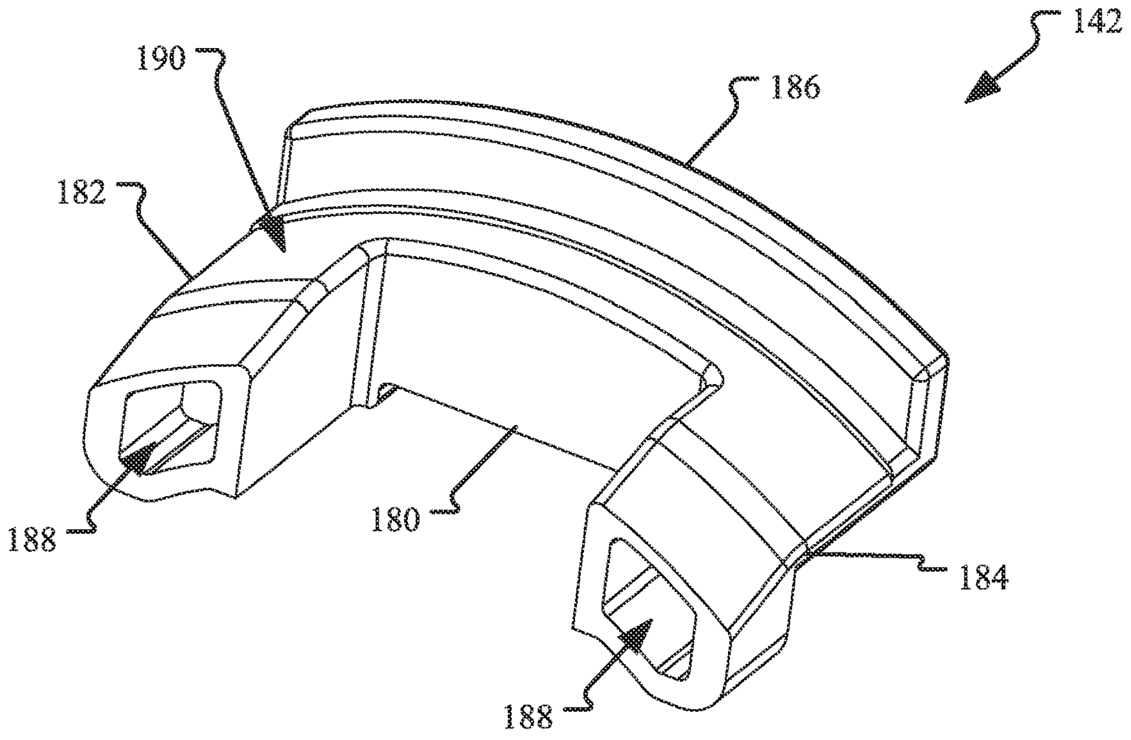
FIGS. 7 and 8 are perspective views of a first elastomeric retainer of the exterior housing assembly shown in FIG. 4.
Figure 8:
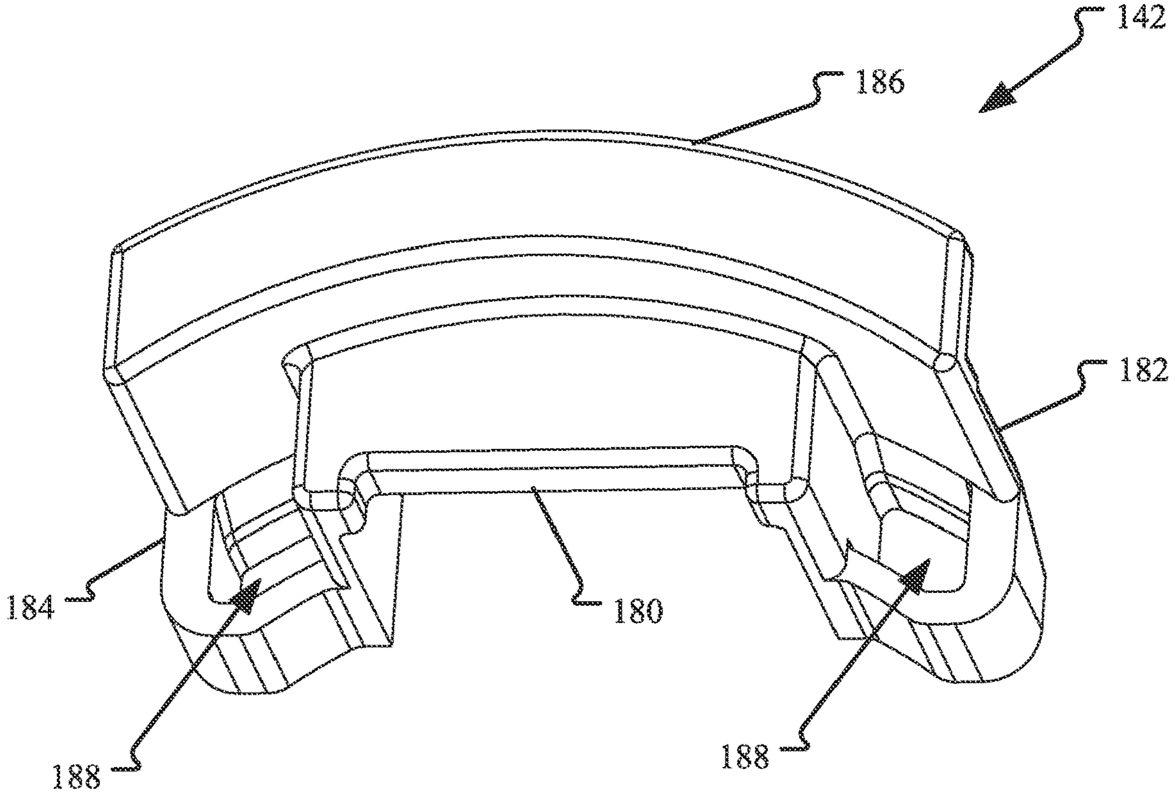

FIGS. 7 and 8 are perspective views of the first elastomeric retainer 142. The first elastomeric retainer 142 is at least partially deformable (e.g., compressible) for frictionally securing the exterior housing assembly 104 (shown in FIG. 4) to the door 102 (shown in FIG. 1). In an example, the elastomeric retainer 142 may be formed from rubber or a elastomer type material (e.g., thermoset or thermoplastic material) or the like. The first elastomeric retainer 142 has a substantially U-shaped body having a base 180 and two legs 182, 184 extending therefrom. The base 180 has a flange 186 projecting therefrom. Each leg 182, 184 forms an opening 188 so that the legs 182, 184 can be coupled to the support arms 176, 178 of the outer housing body 116 (shown in FIG. 6). The first elastomeric retainer 142 has first outer surface 190 that is curved and is at least a portion of the base 180 and the two legs 182, 184. In an example, the distal ends of the legs 182, 184 have a partially tapered outer surface 190 opposite of the flange 186. The tapered surface facilitates the retainer engaging an inner surface of the bore while allowing for easier insertion into the bore, but tighter retention of the assembly during and after installation.

Figure 9:
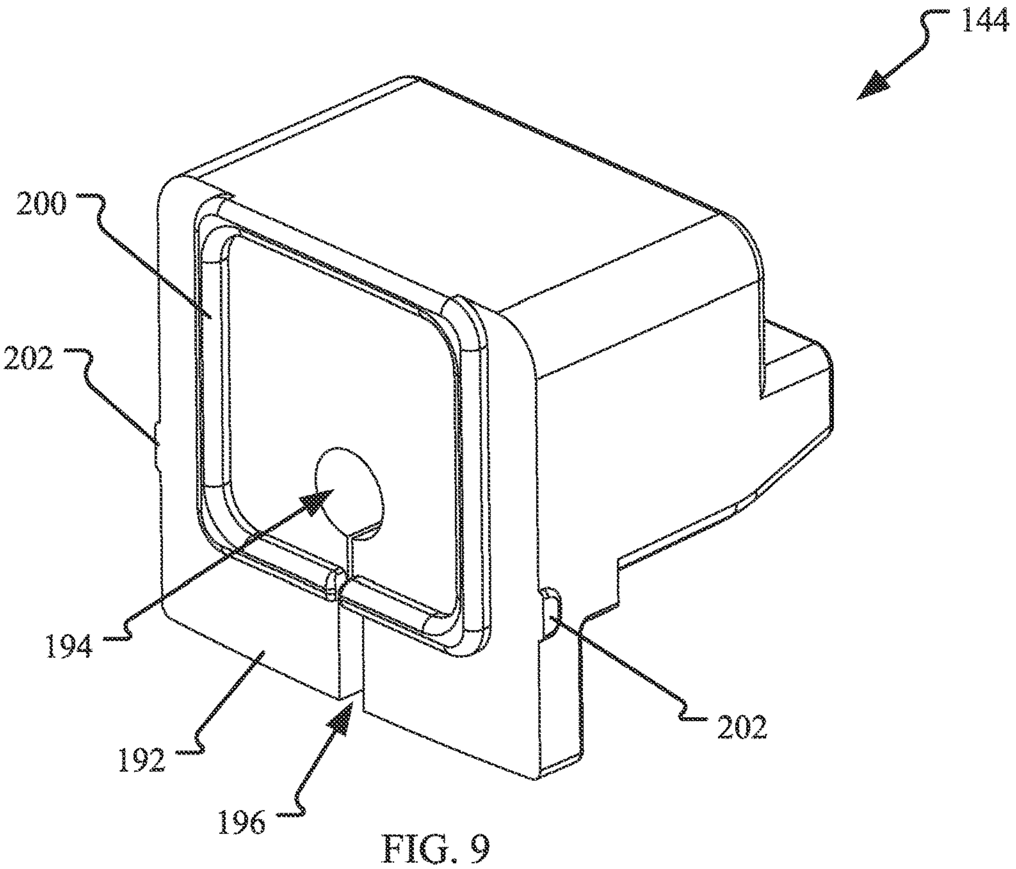
FIGS. 9 and 10 are perspective views of a second elastomeric retainer of the exterior housing assembly shown in FIG. 4.
Figure 10:
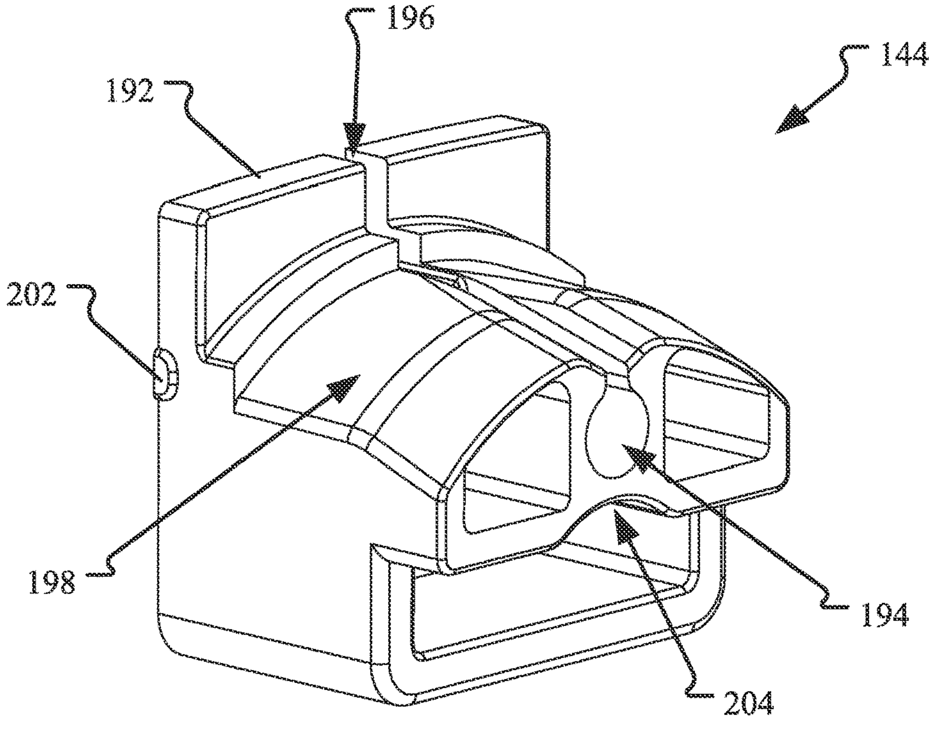

FIGS. 9 and 10 are perspective views of the second elastomeric retainer 144. The second elastomeric retainer 144 has the same or similar material construction as the first elastomeric retainer 142 (shown in FIGS. 7 and 8). The second elastomeric retainer 144 has a substantially square-shaped body with a flange 192 extending therefrom and a channel 194 defined therein. The channel 194 is shaped and sized to at least partially receive the wiring harness 138 (shown in FIG. 4). The body of the second elastomeric retainer 144 has a slit 196 so that the wiring harness 138 can be slid into the channel 194. Proximate the flange 192, a second outer surface 198 that is curved is defined on the body of the second elastomeric retainer 144. The second outer surface 198 may have a tapered shape as it extends outward from the flange 192. The tapered surface facilitates the retainer engaging an inner surface of the bore while allowing for easier insertion into the bore, but tighter retention of the assembly during and after installation. On the other side of the flange 192, a positioning rib 200 is defined on the body and a pair of positioning tabs 202 are also defined. The positioning rib 200 and tabs 202 facilitate coupling the second elastomeric retainer 144 to the outer housing body 116 (shown in FIG. 4). Additionally, a recess 204 is formed proximate the channel 194 opposite the slit 196 so as to facilitate flexibility of the channel 194 and receiving the wiring harness 138.

Figure 11:
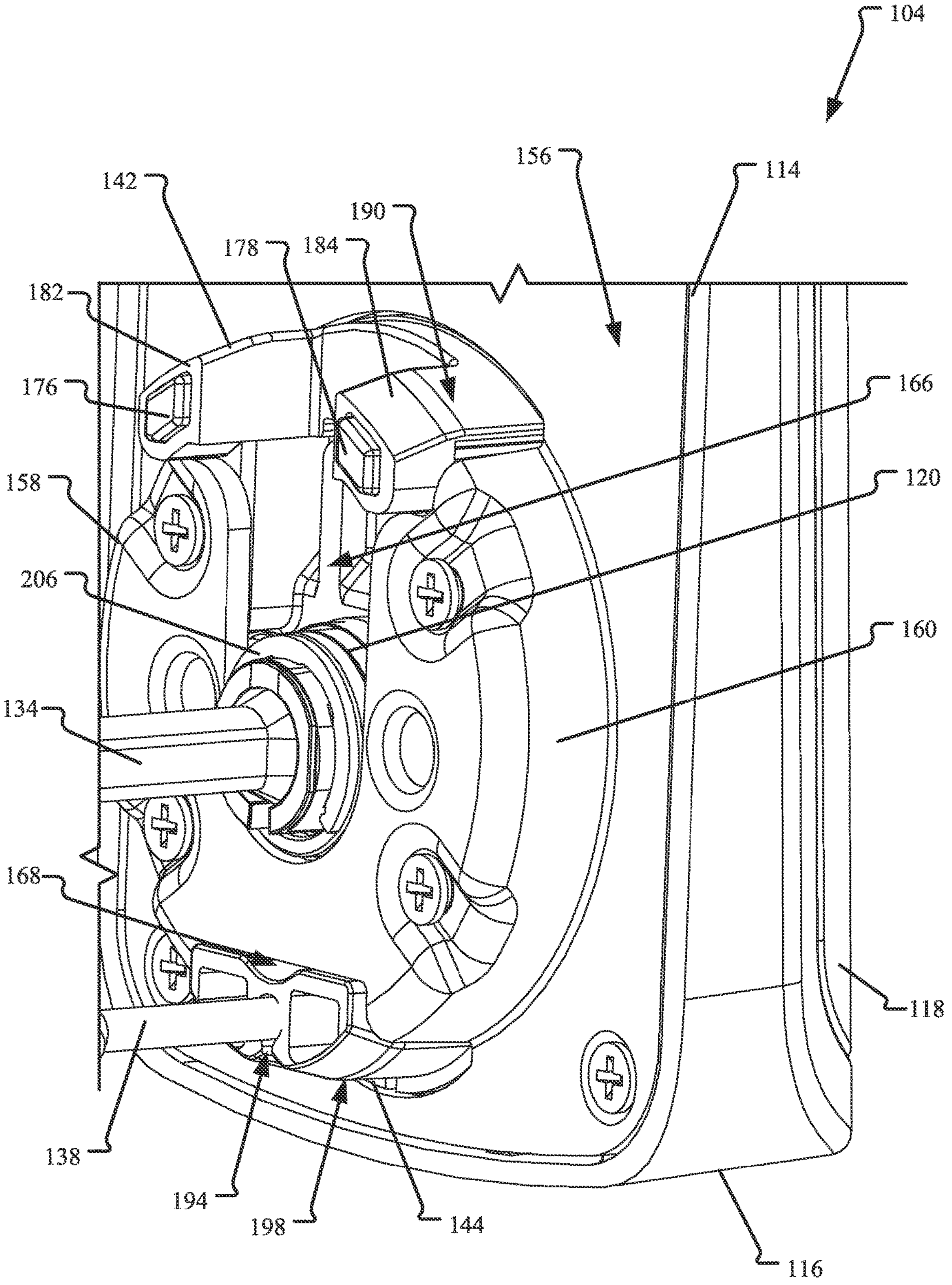
FIG. 11 is a partial perspective view of the exterior housing assembly shown in FIG. 4.

FIG. 11 is a partial perspective view of the exterior housing assembly 104. The elastomeric retainers 142, 144 are positioned along the outer perimeter of the cylindrical bore projection 158 of the mounting plate 114. In the example, the first elastomeric retainer 142 is discrete from the second elastomeric retainer 144 and are positioned on opposites sides of the drive shaft 134 about 180° apart from each other. The distal ends of both of the elastomeric retainers 142, 144 extend further away from the rear surface 156 of the mounting plate 114 than the bore projection 158.

Additionally, the outer surfaces 190, 198 of the elastomeric retainers 142, 144 are radially outward relative to the sidewall perimeter 160 of the bore projection 158 with the outer diameter 162 (shown in FIG. 5). As such, the outer surfaces 190, 198 define an outer diameter distance that is greater than the outer diameter 162 of the bore projection 158. The elastomeric retainers 142, 144 and the bore projection 158 form a substantially cylindrical shape that corresponds to the bore of the door 102. In an aspect, the elastomeric retainers 142, 144 are less than half of the outer perimeter of the substantially cylindrical shape formed by the exterior housing assembly 104. In another aspect, the elastomeric retainers 142, 144 are less than a quarter of the outer perimeter of the substantially cylindrical shape formed by the exterior housing assembly 104. The configuration of the elastomeric retainers 142, 144 facilitate the elastomeric retainers 142, 144 being received at least partially within the bore of the door (shown in FIG. 1) and engaging with the door 102 so as to retain the exterior housing assembly 104 on the door 102 during installation and use.

The first elastomeric retainer 142 extends through the top opening 166 of the mounting plate 114. The first elastomeric retainer 142 has the legs 182, 184 supported on the support arms 176, 178 of the outer housing body 116. The distal ends of the legs 182, 184 taper radially inward so as to facilitate the insertion of the first elastomeric retainer 142 into the bore of the door 102. The U-shaped body of the first elastomeric retainer 142 allows for access to the key cylinder 120 and the drive shaft 134 that are coupled together with a clip 206.

The second elastomeric retainer 144 extends through the bottom opening 168 of the mounting plate 114. The second elastomeric retainer 144 receives the wiring harness 138 that extends out of the exterior housing assembly 104. The wiring harness 138 is received within the channel 194. In an example, the second elastomeric retainer 144 forms a seal at least partially around the wiring harness 138. The distal end of the second elastomeric retainer 144 taper radially inward so as to facilitate the insertion of the second elastomeric retainer 144 into the bore of the door 102.

Figure 12:
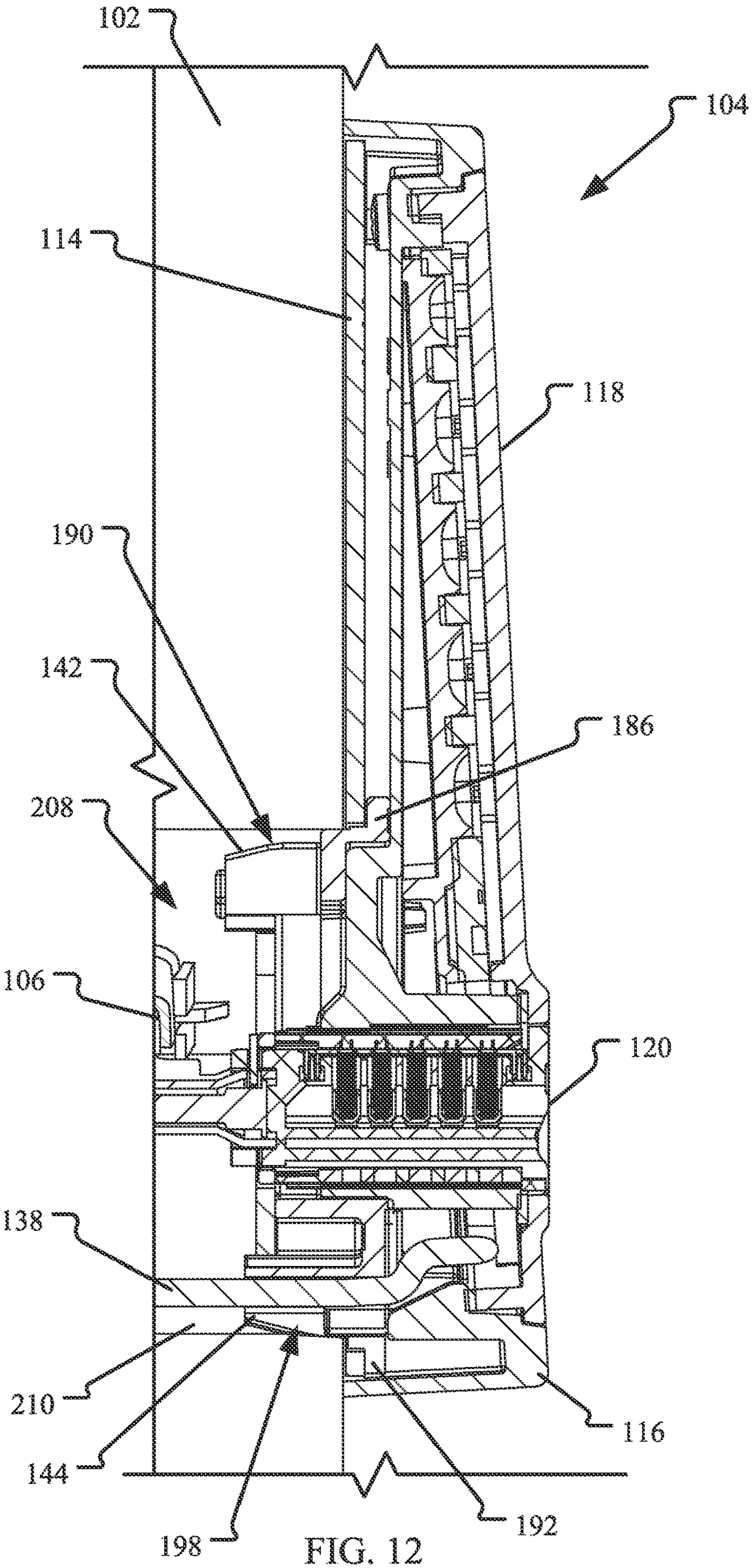
FIG. 12 is a cross-sectional view of the exterior housing assembly shown in FIG. 4 mounted on the door.

FIG. 12 is a cross-sectional view of the exterior housing assembly 104 mounted on the door 102. When the exterior housing assembly 104 is mounted on the door 102, the mounting plate 114 is directly adjacent to the surface of the door 102 and the elastomeric retainers 142, 144 are configured to be received at least partially within a bore 208 and engage with a sidewall 210 of the door 102 that defines the bore 208 to at least partially retain the exterior housing assembly 104 on the door 102. In the example, the outer surfaces 190, 198 of the elastomeric retainers 142, 144 are configured to engage with the sidewall 210 to retain the exterior housing assembly 104 on the door 102. By positioning and retaining the exterior housing assembly 104 in the bore 208, the key cylinder 120 aligns with the latch assembly 106 for operation thereof. Additionally, the wiring harness 138 is facilitated to more easily extend through the bore 208 by positioning the wiring harness 138 at the bottom of the bore 208 via the second elastomeric retainer 144.

In the example, the elastomeric retainers 142, 144 may be at least partially compressed when inserted into the bore 208. As such, the second elastomeric retainer 144 at least partially forms a seal around the wiring harness 138 so as to reduce egress into the exterior housing assembly 104. By positioning the elastomeric retainers 142, 144 at the top and bottom of the bore 208, interference with the latch assembly 106 is reduced. The flanges 186, 192 of the elastomeric retainers 142, 144 are captured between the mounting plate 114 and the outer housing body 116 during the assembly of the exterior housing assembly 104.

Figure 13:
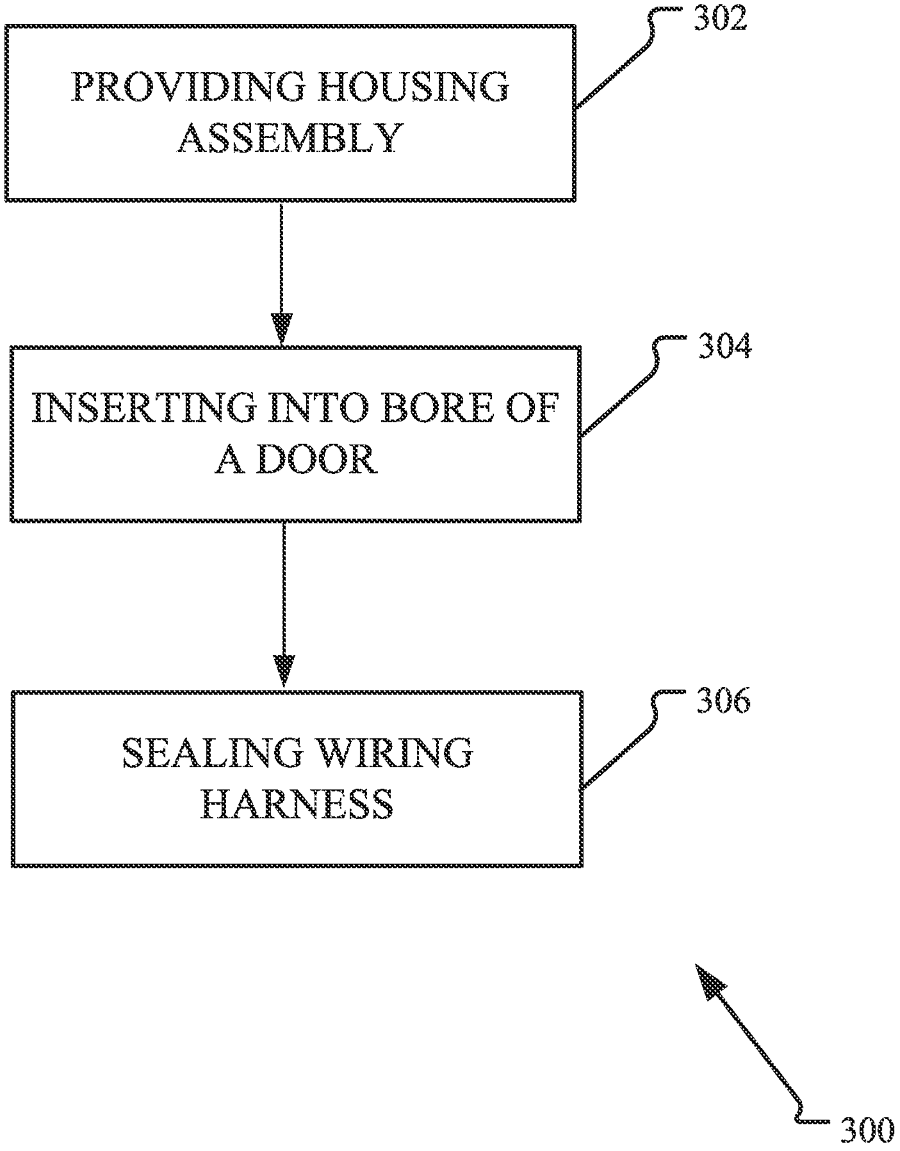
FIG. 13 illustrates a flowchart depicting a method of installing a lock assembly on a door.

FIG. 13 illustrates a flowchart depicting a method 300 of installing a lock assembly on a door. The example methods and operations can be implemented or performed by the assemblies described herein (e.g., the electronic lock assembly 100 with the exterior housing assembly 104, the latch assembly 106, and the interior housing assembly 108 shown in FIGS. 1-12). The method 300 begins with providing a housing assembly (operation 302). In the example, the housing assembly includes a mounting plate having a substantially cylindrical bore projection, one or more elastomeric retainers positioned along an outer perimeter of the substantially cylindrical bore projection, and a wiring harness. The distal ends of the one or more elastomeric retainers projecting further out from the mounting plate than the substantially cylindrical bore projection.

The substantially cylindrical bore projection with the one or more elastomeric retainers are inserted within a bore of the door (operation 304) such that the mounting plate is positioned against a surface of the door. In the example, the one or more elastomeric retainers engage with a sidewall of the door defining the bore so as to retain the housing assembly on the door. Upon retention of the housing assembly within the bore of the door, the wiring harness is sealed at the housing assembly with the one or more elastomeric retainers (operation 306).

In further examples, the method 300 may include coupling the housing assembly to a latch assembly for operation of the latch assembly (e.g., via a drive shaft or torque blade). Additionally or alternatively, the housing assembly may be an exterior housing assembly and the method 300 includes coupling the wiring harness to an interior housing assembly and mounting the interior housing assembly on an opposite side of the door.

The electronic lock assembly described herein facilitates installation and positioning of a housing assembly on a bore of a door. In the examples, an exterior housing assembly includes one or more elastomeric retainers that extend from a rear of the exterior housing assembly. The elastomeric retainers may project axially and/or radially from the other components of the exterior housing assembly so as to engage within the bore and facilitate retaining the exterior housing assembly on the door. By more securely retaining the position of the exterior housing assembly on the door, coupling a latch assembly and an interior housing assembly thereto is more easily facilitated. In examples, the elastomeric retainer may at least partially capture a wiring harness and seal the portion of the wiring harness extending from the exterior housing assembly. While the elastomeric retainers are described as being incorporated within the exterior housing assembly, it is appreciated that elastomeric retainers can additionally or alternatively be included on the interior housing assembly, and/or the latch assembly as required or desired.

EXAMPLES

Illustrative examples of the latch assembly disclosed herein are provided below. An embodiment of the latch assembly may include any one or more, and any combination of, the examples described below.

Example 1. A lock assembly for a door comprising:

- a latch assembly having a bolt movable between at least an extended position and a retracted position;
- a torque blade coupled to the latch assembly and selectively rotatable for moving the bolt between the extended position and the retracted position; and
- a housing assembly configured to couple to the torque blade for driving rotation thereof, the housing assembly including:
  - a housing having one or more bore projections, the one or more bore projections configured to be received at least partially within a bore within the door such that at least a portion of the housing is positionable against a surface of the door; and
  - one or more elastomeric retainers coupled to the housing and extending adjacent the one or more bore projections, wherein the one or more elastomeric retainers are configured to be received at least partially within the bore and engage with a sidewall of the bore so as to retain the housing assembly on the door.

Example 2. The lock assembly of any one of Examples 1-25, wherein the housing further includes a mounting plate having the one or more bore projections and an outer housing body configured to couple to the mounting plate, wherein at least a portion of the one or more elastomeric retainers are disposed between the outer housing body and the mounting plate.

Example 3. The lock assembly of any one of Examples 1-25, wherein at least a portion of the one or more elastomeric retainers are supported on the outer housing body.

Example 4. The lock assembly of any one of Examples 1-25, wherein the one or more bore projections is a single, substantially cylindrical shaped projection having an outer diameter, at least a portion of the one or more elastomeric retainers radially extending beyond the outer diameter of the substantially cylindrical shaped projection.

Example 5. The lock assembly of any one of Examples 1-25, wherein a distal end of the one or more elastomeric retainers extends further out from the housing than the one or more bore projections.

Example 6. The lock assembly of any one of Examples 1-25, wherein the housing assembly further includes a wiring harness, at least a portion of the one or more elastomeric retainers configured to receive the wiring harness that extends out of the housing assembly.

Example 7. The lock assembly of any one of Examples 1-25, wherein the one or more elastomeric retainers form a seal at least partially around the wiring harness.

Example 8. An electronic lock housing assembly for a door comprising:

- a mounting plate including a substantially cylindrical bore projection, the substantially cylindrical bore projection configured to be received at least partially within a bore within the door such that the mounting plate is positionable against a surface of the door;
- an outer housing body coupled to the mounting plate and configured to support one or more systems configured to actuate a latch assembly; and
- one or more elastomeric retainers positioned along an outer perimeter of the substantially cylindrical bore projection, distal ends of the one or more elastomeric retainers projecting further out from the mounting plate than the substantially cylindrical bore projection, wherein the one or more elastomeric retainers are configured to be received at least partially within the bore and engage with a sidewall of the bore so as to retain the housing assembly on the door.

Example 9. The electronic lock housing assembly of any one of Examples 1-25, wherein the one or more elastomeric retainers include a first retainer discrete from and different than a second retainer.

Example 10. The electronic lock housing assembly of any one of Examples 1-25, wherein each of the first retainer and the second retainer have an outer radial surface, the outer radial surfaces defining an outer diameter distance that is greater than an outer diameter of the substantially cylindrical bore projection.

Example 11. The electronic lock housing assembly of any one of Examples 1-25, wherein the outer housing body includes at least one support arm, the first retainer coupled to the at least one support arm.

Example 12. The electronic lock housing assembly of any one of Examples 1-25, wherein the second retainer defines a channel configured to at least partially receive a wiring harness.

Example 13. The electronic lock housing assembly of any one of Examples 1-25, wherein the first retainer is disposed approximately 180° relative to the second retainer.

Example 14. The electronic lock housing assembly of any one of Examples 1-25, wherein at least one of the first and second retainers include a flange that is captured between the mounting plate and the outer housing body.

Example 15. A lock assembly for a door comprising:

- a latch assembly having a bolt movable between at least an extended position and a retracted position;
- a torque blade coupled to the latch assembly and selectively rotatable for moving the bolt between the extended position and the retracted position; and
- an exterior housing assembly configured to couple to the torque blade for driving rotation thereof, the exterior housing assembly including:
  - a housing including one or more bore projections, the one or more bore projections configured to be received at least partially within a bore within the door such that the housing is positionable against a surface of the door;
  - one or more elastomeric retainers coupled to the housing and extending adjacent the one or more bore projections, wherein the one or more elastomeric retainers are configured to be received at least partially within the bore and engage with a sidewall of the bore so as to retain the exterior housing assembly on the door; and at least a portion of an electronic actuation system for the latch assembly and configured to drive rotation of the torque blade.

Example 16. The lock assembly of any one of Examples 1-25, wherein the one or more elastomeric retainers include a first retainer and a second retainer disposed on opposite sides of the torque blade.

Example 17. The lock assembly of any one of Examples 1-25, further comprising a wiring harness, the wiring harness extending through at least one of the first and second retainers.

Example 18. The lock assembly of any one of Examples 1-25, wherein the second retainer is substantially square-shaped with a channel defined therein, the wiring harness disposed at least partially within the channel.

Example 19. The lock assembly of any one of Examples 1-25, wherein the first retainer is substantially U-shaped, each leg of the first retainer supported on the housing.

Example 20. The lock assembly of any one of Examples 1-25, wherein the first and second retainers and the one or more bore projections form a substantially cylindrical shape corresponding to the bore of the door, the first and second retainers being less than half of an outer perimeter of the substantially cylindrical shape.

Example 21. The lock assembly of any one of Examples 1-25, wherein the housing includes an outer housing body and a mounting plate, the mounting plate having the one or more bore projections.

Example 22. The lock assembly of any one of Examples 1-25, wherein the exterior housing assembly further includes a key cylinder mounted on the housing and coupled to the torque blade.

Example 23. A method of installing a lock assembly on a door, the method comprising:

providing a housing assembly including a mounting plate having a substantially cylindrical bore projection, one or more elastomeric retainers positioned along an outer perimeter of the substantially cylindrical bore projection, and a wiring harness, distal ends of the one or more elastomeric retainers projecting further out from the mounting plate than the substantially cylindrical bore projection;

inserting the substantially cylindrical bore projection with the one or more elastomeric retainers within a bore of the door such that the mounting plate is positioned against a surface of the door, wherein the one or more elastomeric retainers engage with a sidewall of the bore so as to retain the housing assembly on the door; and upon retention of the housing assembly within the bore of the door, sealing the wiring harness at the housing assembly with the one or more elastomeric retainers.

Example 24. An elastomeric retention assembly for a lock assembly comprising:

a first elastomeric retainer including a base, a first leg, and a second leg, each of the first leg and the second leg having an end through which a receiver opening is formed, the receiver opening being shaped and sized to receive a support arm of a lock housing body, wherein a first curved bore engagement outer surface is defined at least partially along a side of the base, the first leg, and the second leg, the first curved bore engagement outer surface having a tapered end at distal ends of each of the first leg and the second leg tapering toward the end having the respective receiver opening; and a discrete second elastomeric retainer including a flange and a second bore engagement outer surface extending therefrom, the second elastomeric retainer defining a channel therethrough and accessible via a slit defined through the flange and the second bore engagement outer surface extending therefrom, the channel shaped and sized to receive at least one wire of the lock assembly.

Example 25. The elastomeric retention assembly of any one of Examples 1-25, wherein the first curved bore engagement outer surface and the second curved bore engagement outer surface are configured to be positioned against a portion of an inner bore surface of a door.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

References in the specification to "one example," "an example," "an illustrative example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurements techniques utilized herein. To the extent such terms may not be clearly defined or understood by one having skill in the art, the term "about" shall mean plus or minus ten percent.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed:

1. A lock assembly for a door comprising:

a latch assembly having a bolt movable between at least an extended position and a retracted position;

a torque blade coupled to the latch assembly and selectively rotatable around a shaft axis for moving the bolt between the extended position and the retracted position; and a housing assembly configured to couple to the torque blade for driving rotation thereof, the housing assembly including:

a housing having one or more bore projections and one or more support arms extending along the shaft axis, the one or more bore projections and the one or more support arms configured to be received at least partially within a bore within the door such that at least a portion of the housing is positionable against a surface of the door; and one or more elastomeric retainers coupled to the housing and extending adjacent the one or more bore projections, wherein the one or more elastomeric retainers are configured to be received at least partially within the bore and engage with a sidewall of the bore so as to retain the housing assembly on the door, and wherein at least one of the one or more elastomeric retainers has a distal end defining an opening that at least partially receives the one or more support arms.

2. The lock assembly of claim 1, wherein the housing further includes a mounting plate having the one or more bore projections and an outer housing body having the one or more support arms, the outer housing body configured to couple to the mounting plate, wherein at least a portion of the one or more elastomeric retainers are disposed between the outer housing body and the mounting plate.

3. The lock assembly of claim 2, wherein at least a portion of the one or more elastomeric retainers are supported on the outer housing body.

4. The lock assembly of claim 1, wherein the one or more bore projections is a single, substantially cylindrical shaped projection having an outer diameter, at least a portion of the one or more elastomeric retainers radially extending beyond the outer diameter of the substantially cylindrical shaped projection.

5. The lock assembly of claim 1, wherein the distal end of the one or more elastomeric retainers extends further out from the housing along the shaft axis than the one or more bore projections.

6. The lock assembly of claim 1, wherein the housing assembly further includes a wiring harness, at least a portion of the one or more elastomeric retainers configured to receive the wiring harness that extends out of the housing assembly.

7. The lock assembly of claim 6, wherein the one or more elastomeric retainers form a seal at least partially around the wiring harness.

8. An electronic lock housing assembly for a door comprising:

a mounting plate including a substantially cylindrical bore projection, the substantially cylindrical bore projection configured to be received at least partially within a bore within the door such that the mounting plate is positionable against a surface of the door;

an outer housing body coupled to the mounting plate and configured to support one or more systems configured to actuate a latch assembly, the outer housing body including at least one support arm; and one or more elastomeric retainers positioned along an outer perimeter of the substantially cylindrical bore projection, distal ends of the one or more elastomeric retainers projecting further out from the mounting plate than the substantially cylindrical bore projection, wherein at least one of the one or more elastomeric retainers has the distal end defining an opening that at least partially receives the at least one support arm, and wherein the one or more elastomeric retainers are configured to be received at least partially within the bore and engage with a sidewall of the bore so as to retain the housing assembly on the door.

9. The electronic lock housing assembly of claim 8, wherein the one or more elastomeric retainers include a first retainer discrete from and different than a second retainer.

10. The electronic lock housing assembly of claim 9, wherein each of the first retainer and the second retainer have an outer radial surface, the outer radial surfaces defining an outer diameter distance that is greater than an outer diameter of the substantially cylindrical bore projection.

11. The electronic lock housing assembly of claim 9, wherein the first retainer is coupled to the at least one support arm.

12. The electronic lock housing assembly of claim 9, wherein the second retainer defines a channel configured to at least partially receive a wiring harness.

13. The electronic lock housing assembly of claim 9, wherein the first retainer is disposed approximately 180° relative to the second retainer.

14. The electronic lock housing assembly of claim 9, wherein at least one of the first and second retainers include a flange that is captured between the mounting plate and the outer housing body.

15. A lock assembly for a door comprising:

a latch assembly having a bolt movable between at least an extended position and a retracted position;

a torque blade coupled to the latch assembly and selectively rotatable around a shaft axis for moving the bolt between the extended position and the retracted position; and an exterior housing assembly configured to couple to the torque blade for driving rotation thereof, the exterior housing assembly including:

a housing including one or more bore projections and one or more support arms extending along the shaft axis, the one or more bore projections and the one or more support arms configured to be received at least partially within a bore within the door such that the housing is positionable against a surface of the door;

one or more elastomeric retainers coupled to the housing and extending adjacent the one or more bore projections, wherein the one or more elastomeric retainers are configured to be received at least partially within the bore and engage with a sidewall of the bore so as to retain the exterior housing assembly on the door, and wherein at least one of the one or more elastomeric retainers has a distal end defining an opening that at least partially receives the one or more support arms; and at least a portion of an electronic actuation system for the latch assembly and configured to drive rotation of the torque blade.

16. The lock assembly of claim 15, wherein the one or more elastomeric retainers include a first retainer and a second retainer disposed on opposite sides of the torque blade.

17. The lock assembly of claim 16, further comprising a wiring harness, the wiring harness extending through at least one of the first and second retainers, wherein the second retainer is substantially square-shaped with a channel defined therein, the wiring harness disposed at least partially within the channel.

18. The lock assembly of claim 16, wherein the first retainer is substantially U-shaped, each leg of the first retainer supported on the one or more support arms of the housing.

19. The lock assembly of claim 16, wherein the first and second retainers and the one or more bore projections form a substantially cylindrical shape corresponding to the bore of the door, the first and second retainers being less than half of an outer perimeter of the substantially cylindrical shape.

20. A method of installing a lock assembly on a door, the method comprising:

providing a housing assembly including a mounting plate having a substantially cylindrical bore projection and one or more support arms, one or more elastomeric retainers positioned along an outer perimeter of the substantially cylindrical bore projection, and a wiring harness, distal ends of the one or more elastomeric retainers projecting further out from the mounting plate than the substantially cylindrical bore projection, and wherein at least one of the one or more elastomeric retainers has the distal end defining an opening that at least partially receives the one or more support arms;

inserting the substantially cylindrical bore projection and the one or more support arms with the one or more elastomeric retainers within a bore of the door such that the mounting plate is positioned against a surface of the door, wherein the one or more elastomeric retainers engage with a sidewall of the bore so as to retain the housing assembly on the door; and upon retention of the housing assembly within the bore of the door, sealing the wiring harness at the housing assembly with the one or more elastomeric retainers.

* * * * *